June 11, 1963   J. H. JENNINGS ET AL   3,092,866
RENEWABLE WIPER BLADE AND METHOD OF MAKING SAME
Filed Aug. 22, 1960
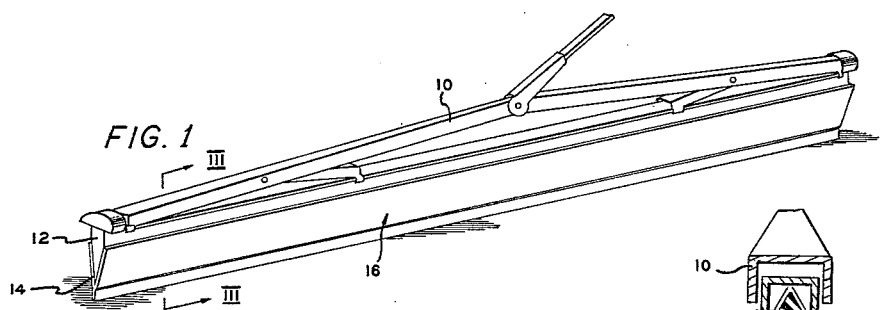
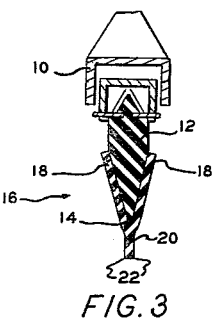
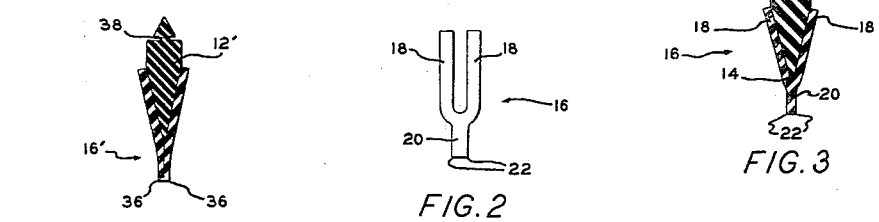
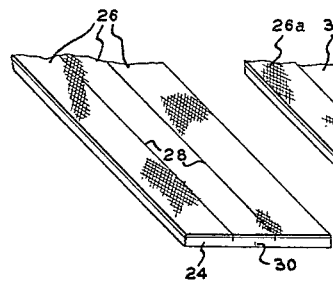 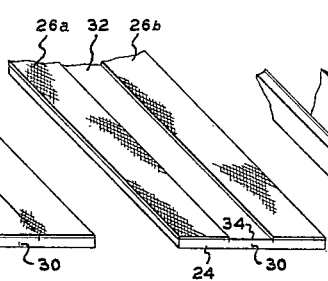 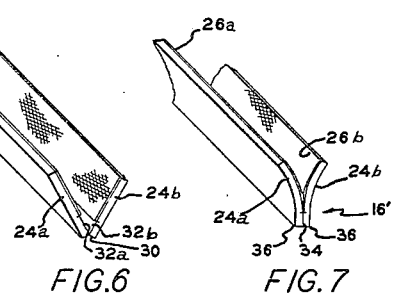 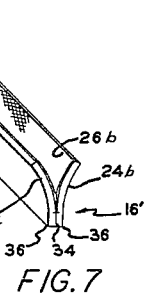
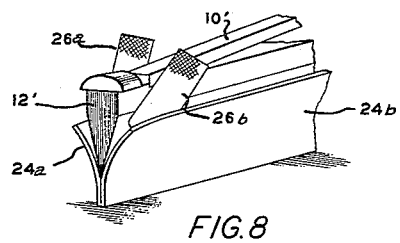
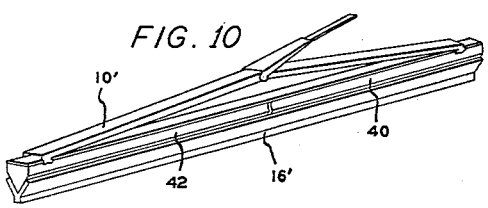
INVENTOR
JOHN H. JENNINGS
CHARLES S. THOMPSON
BY *Beaman & Beaman*
ATTORNEY

United States Patent Office 3,092,866
Patented June 11, 1963

3,092,866
RENEWABLE WIPER BLADE AND METHOD
OF MAKING SAME
John H. Jennings and Charles S. Thompson, Jackson,
Mich.; said Thompson assignor to said Jennings
Filed Aug. 22, 1960, Ser. No. 51,181
8 Claims. (Cl. 15—250.36)

The invention relates to improvements in the wiper blade art and particularly pertains to wiper blades employing resilient members having a wiping edge wherein a substitute wiping edge may be provided for a blade after the original edge has become worn or otherwise lost its ability to wipe clean.

Wiper blades, particularly those employed in clearing vehicular windshields are required and expected to operate efficiently under very adverse weather conditions. In that such blades are normally constructed of rubber, or a rubber-like material, and are forcibly biased into engagement with the windshield to clean dirt, dust and other foreign matter as well as water from the windshield, the wiping edge is subject to abrasive wear and has a relatively limited effective life. In addition to loss of efficiency due to normal wear, the wiping edge is often damaged from adhesion to ice, ice scrapers and careless handling by service personnel.

Upon a wiping blade becoming worn or damaged it has previously been necessary to replace the entire blade assembly which includes the resilient blade and the holder therefore. In that the blades and holders employed with present day convex and three dimensional windshields are relatively complex in structure, the costs of windshield wiper blade replacements are considerable and as a result, many drivers will defer wiper blade replacement at the expense of optimum vision and safety requirements.

We have found that a significant percentage of those wiper blades which must be replaced due to poor wiping characteristics are sound except for the wiper edge itself and it is the primary purpose of the invention to provide means for salvaging blades having worn or damaged wiping edges at nominal costs by replacing the ineffective edge with a new wiping edge. In the practice of the invention, the body of the blade is employed as the base and support for the new wiping edge and, hence, the original blade holder will likewise be employed with the salvaged blade.

Basically, the invention comprises a resilient elongated member having a wiping edge which is bonded by cement or other suitable means to the worn blade. In that the member is flexible, it will flex with the blade to conform to the windshield configuration and the blade is employed to support the substitute wiping edge member to insure that the edge does not collapse or misform under the pressure applied thereto by the blade holder arm. It is also contemplated that the principles and concept of the invention may be employed in the construction of new blades and a use of the invention will also be described wherein blades having weak or damaged body portions may be salvaged to produce an effective wiper blade.

It is, thus, an object of the invention to provide a substitute wiper blade edge for a wiper blade which substitute is of economical manufacture and which may be easily and quickly affixed to a wiping blade to replace a worn or damaged wiping edge.

Another object of the invention is to provide a substitute wiper blade edge for a wiper blade which substitute is capable of operating in the manner of the original edge and produce results equal, if not superior, to the original edge.

A further object of the invention is to provide a substitute wiper blade edge for a wiper blade which substitute may be attached to the wiper blade by conventional means and with the exercise of ordinary skill.

Another object of the invention is to provide a substitute wiper blade for a wiper blade wherein the substitute edge member may be manufactured from commercially available materials.

Yet another object of the invention is to provide a sharper wiper blade edge for a wiping blade than is possible with prior manufacturing processes whereby a superior cleaning action is produced.

These and other objects of the invention arising from the details and relationships of embodiments thereof will be apparent from the following description and accompanying drawing wherein:

FIG. 1 is a perspective view of an assembled conventional wiper blade with an embodiment of the substitute wiping edge of the invention affixed thereto, FIG. 2 is an end elevational enlarged view of one embodiment of substitute wiping blade element in accordance with the invention, FIG. 3 is a sectional elevational view of the element of FIG. 2 as affixed to a blade as taken along section III—III of FIG. 1, FIGS. 4 through 7 are perspective views of the end section of another embodiment of a substitute wiping edge showing the steps of manufacture thereof, FIGS. 8 is an end detail view of the embodiment of FIGS. 4 through 7 as being applied to a blade, FIG. 9 is a sectional elevational view of a blade and the wiping element of FIGS. 4 through 7 as assembled, and FIG. 10 is a perspective view of a blade employing the invention wherein the blade is composed of a pair of blade members.

As described above, the invention is employed with conventional wiping blade components and as shown in FIG. 1, such components usually take the form of a blade holder 10 on which is mounted a flexible blade 12, usually of rubber, having the well-known wiping edge 14. The holder 10 may take many different forms and is usually constructed of metal having variously arranged levers and linkages to flexibly and adequately support the wiping blade 12. The assembly of FIG. 1 is shown having a substitute wiping edge element 16 affixed thereto and the illustrated embodiment is that shown in detail in FIGS. 2 and 3.

An embodiment of the invention may take the form of an elongated member of a length substantially equal to that of the wiping blade 12 to which it is affixed. The element 16 is substantially of Y configuration, having bifurcated support members 18 and a stem wiping portion 20. The member 16 is preferably formed of rubber or similar synthetic material and is so constructed that the lower edge of the stem is provided with a pair of sharply defined longitudinal wiping edges 22. Upon the wiping edge 14 of the blade 12 becoming "dull," pitted, or otherwise rendered inefficient, the substitute wiping element 16 may be affixed to the blade 12 as shown in FIG. 3 by applying a rubber cement or similar bonding material to the inside surfaces of the fork elements 18 or by other affixing techniques, whereby the wiping element 16 is firmly affixed to the blade and, in effect, becomes an integral part thereof. As the blade edge 14 engages the apex of the valley defined by the forks 18, the stem 20 is firmly supported and backed by the wiping blade element and, hence, the wiping blade assembly will function in the original manner except that the wiping action will be produced by the edges 22 of the element 16.

Another embodiment of the invention is shown in FIGS. 4 through 9 and the general configuration of this embodiment is best illustrated in FIGS. 7 through 9. This embodiment of the invention is likewise of a Y configuration. However, this embodiment may be constructed from planar material which is available on the commercial market and does not require the special extruded form of the embodiment of FIGS. 2 and 3.

In the construction of this embodiment, an elongated planar portion of rubber or rubber-like material 24 of a form as shown in FIG. 4 is employed. One surface of the material is treated so as to be bondable to the blade 12, and this surface is protected by Holland cloth or other covering material 26 adhering thereto. This bondable surface may be treated with any suitable material which enables the rubber or rubber-like material to be bonded to the blade 12 such as uncured or partially cured rubber containing vulcanizing aiding additives, bonding cement or the like and is hereinafter referred to as the adhesive surface. The combination of the planar material, adhesive surface and a protective backing material such as Holland cloth is widely used in the rubber arts, especially in the tire tube repair field and such material is employed for tire tube patches and the like.

After the material 24 has been formed to the desired rectangular configuration having a length substantially equal to the length of the blade to which the substitute edge is to be affixed, the adhesive side of the material is partially slit in the central region by a pair of spaced incisions 28 extending the entire length of the material. The opposite side of the material 24 is centrally slit at 30 throughout its length and it will be appreciated that the slit 30 is centrally located with respect to the incisions 28. It will be noted that the incisions 28 extend through the Holland cloth and into the material 24 a slight distance to increase the flexure of the element in its final form and the depth of the slit 30 terminates short of the adhesive surface.

The second step of manufacture is shown in FIG. 5 wherein the Holland cloth intermediate the incisions 28 is "peeled" from the material 24 exposing the adhesive surface 32. The next step of manufacture, as shown in FIG. 6, consists of hinging or folding the material 24 about the hinge portion 34 defined by the uncut material between the slit 30 and the adhesive surface 32. It will be noted that upon hinging the material in this manner, the exposed adhesive surface becomes divided into two surface portions 32a and 32b and upon folding the portions of the material to bring the surfaces 32a and 32b into contact with each other the adhesive surfaces become bonded and the element assumes the Y configuration of FIG. 7.

In the form of FIG. 7 the element is ready to be attached to a wiper blade 12' and it will be appreciated that the Holland cloth strips 26a and 26b remaining upon the material 24 will protect the unbonded adhesive surfaces and permits the element 16' to be maintained in a Y configuration for indefinite periods of time.

When it is desired to apply the substitute wiping blade element 16' of FIG. 7 to a wiping blade 12', FIG. 8, the forks 24a and 24b of the element are spread apart, an action which is facilitated by the extension of the incisions 28 into the material 24 and the wiping edge of the blade 12 is inserted as far as possible into the valley between the forks to engage the intersection thereof. Thereupon, the operator will grasp the Holland cloth strips 26a and 26b remaining upon the forks and peel the same to the right, FIG. 8, thereby exposing the adhesive surface of the forks to the side of the wiping blade. As the adhesive material forked surface is exposed to the blade, the operator may press the exposed fork into engagement with the blade, bonding the forks to the blade. Upon the completion of this operation the element 16' will be assembled to the blade as shown in FIG. 9.

It will be appreciated that, in applying the embodiment of FIGS. 4 through 9 to a wiper blade, the fact that the adhesive surface employed to bond the element to the blade is not exposed to the air until the time of completing the assembly, the adhesive characteristics will be at their optimum, and the opportunity for foreign matter to become interposed between the element forks and blade is eliminated. In that the wiping blades to which the invention is applied have been exposed to the weather for a period of time, it is advisable to clean and prepare the sides and wiping edge of the wiping blade to which the element forks are affixed prior to bonding the element thereto, and such a cleaning action may be readily accomplished by scouring the sides of the blade with a wire brush or similar cleaning tool or, if desired, the blade may be cleaned by the use of suitable cleaning compounds. Final preparation of the blade may be also aided by treating the sides and wiping edge of the blade with a suitable adhesive, such as rubber cement.

One of the important advantages of the embodiment of FIGS. 4 through 9 lies in the fact that the wiping edges 36 defined upon the element 16' are much more sharply defined than those wiping edges produced by conventional molding and manufacturing processes. In that the edges 36 are defined by the slit 30, it will be appreciated that the edges 36 will be free of the usual radius that is necessary in forming a molded or extruded edge and that the higher contact pressures produced by the use of a very sharp edge will result in a superior wiping and cleaning action. For this reason, the wiping action of the substitute wiping edge element 16' is superior to that obtained with a new wiping blade constructed in the conventional manner.

In the aforementioned embodiments, the substitute wiping blade element has been described as being attached to a single used blade and it has been assumed that the blade is serviceable throughout its length and that only the wiping edge is defective. However, wiping blades occasionally fail due to rupture of the blade at the upper flexing regions as illustrated at 38 in FIG. 9. In that such ruptures often occur throughout only a portion of the length of the blade, it is possible to remove that portion of the blade which is defective from the holder 10' and replace that portion with another used blade 40 which has a sound upper flexing portion by attaching the sound portion to the holder 10' in the conventional manner and abutting this portion to the original sound blade portion 42 to provide a wiper blade of two parts having a sound base portion, as shown in FIG. 10. After the wiping blade portions 40 and 42 have been so assembled in holder 10', a substitute wiping blade element 16 or 16', in accordance with the invention, may be applied to the two wiping blade portions to provide a uniform and new wiping edge and it will be appreciated that the described method may be employed to salvage wiping blades which would normally be discarded.

It will, thus, be appreciated that the invention discloses means for renewing the effectiveness of a worn wiper blade at a very nominal cost and, as the invention may be easily attached to a worn blade, car owners, as well as service station attendants, may apply the substitute wiping edge to the blade. The configuration of the invention provides effective wiping edges adjacent a substantial wiping edge stem support portion and, therefore, is less susceptible to damage due to careless handling than wiper blades of conventional configuration.

While the substitute wiper blade element is shown and described as employed with a used wiper blade, the structure and method of the invention may also be utilized in the manufacture of new wiper blades. For instance, by using an elongated base member of the configuration of a conventional blade 12 and attaching an element 16 or 16' thereto, a novel wiper blade construction is produced. Likewise, the concept of producing a wiper blade having very sharp wiping edges by slitting and folding the flexible material may be employed in the wiper blade art with different wiper element constructions than those described and this method of manufacture may be used in new wiper blade embodiments.

What is claimed is:

1. A wiping blade comprising, in combination, a pair of elongated, planar sheets defined by spaced longitudinal edges and formed of a flexible and resilient material, at least one of said longitudinal edges of each sheet constituting a cut edge, each of said sheets having first and second sides, bonding means bonding said first sides of said sheets together adjacent said cut edges thereof upon said cut edges of said sheets being substantially aligned in adjacent parallel relation, said cut edges defining sharp wiping corners with said second sheet sides, said bonding means terminating short of the sheet longitudinal edges remote from said cut edges whereby the unbonded sheet portions define a bifurcated wiping blade portion.

2. A wiping blade formed from sheet material, said sheet having first and second planar sides, a cut slit formed in said first side terminating short of said second side defining an unsevered portion in said sheet, said unsevered portion functioning as a hinge and connecting element upon folding the second sides of said sheet about said unsevered portion whereby the sheet corner edges formed by said slit and first side thereof define a pair of sharp wiping edges and bonding said second sides together adjacent said unsevered portion.

3. The method of making a wiper blade having a wiper portion and a bifurcated portion comprising the steps of superimposing a pair of elongated planar sheets of flexible resilient material, each having a cut longitudinal edge, together whereby the cut edges of said sheets are coplanar and adjacent each other throughout their length, bonding said sheets together adjacent said cut edges in an area defined on one side by said cut edges and on the opposite side by a transition line between bonded and unbonded sheet portions substantially parallel to and spaced from said cut edges, the unbonded sheet portions constituting said bifurcated portion.

4. The method of making a wiper blade from an elongated planar sheet of flexible strip material having first and second sides comprising the steps of partially slitting said strip longitudinally on the first side thereof defining a longitudinal hinge portion adjacent said second side, folding the two portions of said second side defined by said hinge portion toward each other about said hinge portion and bonding the two portions of said second side together adjacent said hinge portion.

5. The method of making a wiper blade as in claim 4 wherein said second sheet side is preprepared as a bonding surface and protected by a covering and said covering in the region of said hinge portion is removed whereby bonding of said two portions occurs upon the folding of said strip about said hinge portion and pressing said two portions of said second side together.

6. In combination, a windshield wiper blade having opposed converging side portions intersecting at an apex, said apex defining a wiping edge, an auxiliary wiping edge member of Y-cross section having converging bifurcated portions and a stem portion defined at the intersection of said bifurcated portions, said auxiliary wiping edge member consisting of a pair of resilient, flexible sheets of equal width and length each having a cut longitudinal edge, said sheets being bonded together throughout their length in superimposed relation adjacent said cut edges wherein said cut edges are in coplanar relationship, the width of the bonded portions of said sheets being less than the width of the sheets whereby the bonded portions of said sheets constitute said stem portions and the unbonded portions of said sheets constitute said bifurcated portions, said bifurcated portions being of a width substantially equal to the width of said blade converging side portions and being bonded to said side portions.

7. As an article of manufacture, an auxiliary wiping blade having a Y-cross section consisting of a stem and a pair of bifurcated portions extending from said stem, sai dblade composed of a planar sheet of resilient, flexible, rubber-like material having first and second sides, said sheet being slit by cutting perpendicular to the plane thereof from said first side and partially therethrough, said sheet being folded about the unsevered portion between said slit and said second side, whereby said sheet second side on opposite sides of said unsevered portion is brought into engagement, bonding said engaging second side portions adjacent said unsevered portoin to define said stem, the sheet portions removed from said bonded engaged sheet portions constituting said bifurcated portions, the folding of said sheet about said unsevered portion opening said slit, whereby the opposed sides of said slit become substantially coplanar and define sharp wiping edges with the intersected first sheet side.

8. The method of making an auxiliary wiper blade from a strip of flexible, resilient, material having first and second sides and parallel longitudinal edges wherein said second side has been preprepared as a bonding surface and is covered by a protective covering comprising the steps of partially slitting said strip therethrough in the longitudinal direction parallel to and centrally of said longitudinal edges defining an unsevered hinge portion between the bottom of the slit and said second side, slitting said covering at spaced, parallel locations disposed equidistant from said unsevered portion on opposite sides thereof and parallel to said longitudinal edges, removing said covering intermediate the slits thereof and in opposed relation to said strip slit, folding said strip longitudinally about said unsevered portion whereby said strip slit is opened and the exposed preprepared bonding surface of said second side and on opposed sides of said unsevered portion are brought into engagement and bonded together.

References Cited in the file of this patent

UNITED STATES PATENTS

| | | |
|---|---|---|
| 2,141,023 | Ryan | Dec. 20, 1938 |
| 2,262,796 | Cavalero | Nov. 18, 1941 |
| 2,908,028 | Runton et al. | Oct. 13, 1959 |
| 2,926,375 | Flynn | Mar. 1, 1960 |